INVENTOR
CARL JOHN HEFFELFINGER,
BY Robert W Black
AGENT

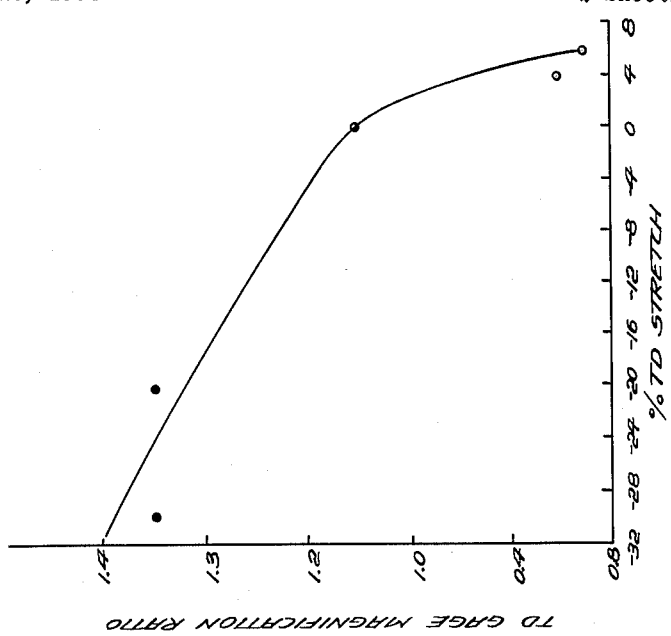
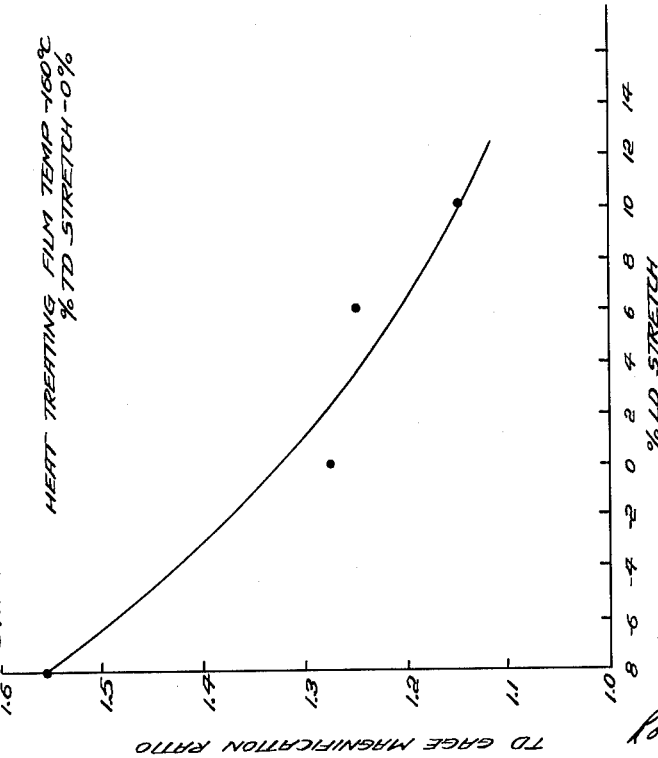

United States Patent Office 3,257,489
Patented June 21, 1966

3,257,489
PROCESS FOR IMPROVING GAUGE OF ORGANIC, THERMOPLASTIC, CRYSTALLIZABLE POLYMERIC FILM BY STRETCHING DURING HEAT TREATING
Carl John Heffelfinger, Circleville, Ohio, assignor to E. I. du Pont de Nemours and Company, Wilmington, Del., a corporation of Delaware
Filed Nov. 28, 1961, Ser. No. 155,331
9 Claims. (Cl. 264—289)

This invention relates to film of organic, thermoplastic, crystallizable polymeric material and more particularly to an improved process for heat-treating a previously oriented film of organic, thermoplastic, normally crystalline polymeric material.

There are numerous synthetic organic polymers such as polyethylene terephthalate which are capable of being formed into translucent or transparent films having excellent physical properties. Certain of these properties, such as tensile strength, impact strength, flex life, etc., may be appreciably enhanced by the process of molecular orientation. Thus, biaxially stretched polyethylene terephthalate film, e.g., film which has been stretched in two mutually perpendicular directions, is a highly versatile material because of its high level of physical properties and outstanding resistance to chemical degradation. These oriented films, when heat treated at elevated temperatures, i.e., over 100° C., exhibit a high degree of dimensional stability and resistance to shrinkage at elevated temperatures up to the heat-treating temperatures.

In conventional methods for the production of biaxially oriented, organic, thermoplastic, crystallizable polymeric film, such as polyethylene terephthalate film, the polymer in a molten state is either (1) extruded through a flat die orifice to form a film; thereafter the film is cooled and stretched longitudinally and then stretched transversely, or (2) the film may be prepared by extruding the polymeric composition as a molten polymer through a circular die orifice, inflating the polymer to form a continuous tubing, stretching the tubing in both the longitudinal and transverse directions by means of either a simultaneous or sequential stretching operation, and cooling the film. In order to give the film satisfactory dimensional stability and to enhance the tensile properties of the film, the film may then be heat set while being held under tension.

The prior art processes have one very serious drawback. It has been found that gauge variations, i.e., thick and thin areas, in the cast film, resulting from minute variations and/or non-uniformities in the extrusion orifice, are amplified by the processes, particularly by the final heat-setting step. In many cases the final gauge variation of the stretched film is intolerable even though the gauge variation of the initial cast film was within acceptable limits. Film gauge variations, particularly those measured in the transverse direction, i.e., in a direction transverse to the direction in which the film was extruded and ultimately wound on a roll, presents a serious problem in winding up the film to obtain acceptable roll formation. For example, the thicker sections formed in longitudinal paths in the continuous length of film, provide hard surfaces on the wound rolls while the thinner longitudinal sections are soft. Such rolls have a tendency to telescope during handling, and particularly during winding and unwinding operations. Furthermore, it is difficult to maintain an even tension upon such film when unwinding the roll, thus making slitting difficult. Moreover, film having these relatively high gauge variations across its width is also difficult to handle in various types of converting equipment such as bag-making machines. Such film is also difficult to handle as photographic film in cameras and projectors, and as sound or video tape recording and play-back equipment.

It is an object of this invention to provide an improved process for heat treating oriented organic, thermoplastic, crystallizable polymeric films.

A further object is to provide an improved process for heat-treating an oriented organic, thermoplastic, crystallizable polymeric film to form a film having not only a minimum of gauge variation in the transverse direction but also enhanced physical properties.

A still further object is to provide a simple, economical process for the preparation of bi-directionally oriented polyethylene terephthalate film which is characterized by a uniformly high physical property level and gauge contour in the transverse direction. These and other objects will appear hereinafter.

These and other objects are accomplished by the present invention which comprises a process for heat-treating organic, thermoplastic, crystallizable polymeric film wherein the film has been previously molecularly oriented in both the longitudinal direction and transverse direction to an extent of at least 2.5 times its initial dimensions, comprising heating the oriented film to a temperature above 100° C. while exerting on the film a positive stretching action in the transverse direction, i.e., transverse to the direction of extrusion.

The process and advantages of the present invention are illustrated in the drawings, wherein:

FIGURE 3 shows the transverse direction gage magnification ratio as a function of the percent longitudinal direction stretch during heat treating.

FIGURE 4 shows transverse direction gage magnification ratio as a function of the percent transverse direction stretch during heat treating.

Figure 1:
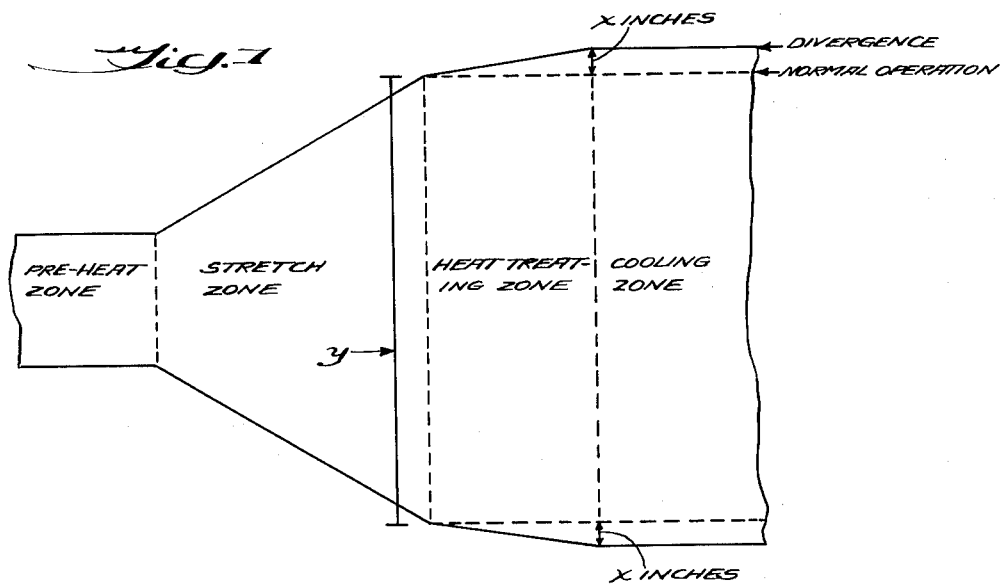
FIGURE 1 illustrates a process of this invention and shows the extension of a tenter frame where the film is heatset while positively stretched in the transverse direction.

Although in the examples and descriptions to follow, primary emphasis will be placed on heat-treating of oriented polyethylene terephthalate films, it should be emphasized that the heat-treating process embodied in the present invention is applicable to other oriented films of organic, thermoplastic crystallizable polymers such as polymers of vinylidene chloride, vinyl chloride, polyethylene-2,6-naphthalate, polyhexamethylene adipamide, polytetramethylene-1,2-dioxybenzoate, polyethylene - 1,5-naphthalate, polyhexamethylene sebacamide, polycaproamide, copolymers of ethylene isophthalate and ethylene terephthalate, polyvinyl fluoride, polyvinylidene fluoride, linear polyesters and polyester-amides from 1,4-cyclohexane-dimethanol, polyoxymethylene, polyethylene, blends of linear and branched polyethylenes, and polypropylene.

In order to realize the benefits of the heat-treating process of the present invention, it is requisite that the film to be heat-treated be molecularly oriented in both the longitudinal and transverse directions. For most practical applications, the film will be molecularly oriented by stretching the film (either in the form of a flat film which has been previously extruded on a quench drum, quenched, and then heated to temperatures suitable for stretching, or in the form of an inflated tubing which is bi-directionally stretched after being extruded in molten form and inflated), to an extent of at least 2.5 times its initial dimensions and preferably from 2.5 to 5 times its initial dimensions.

The temperature at which the film is heat-treated in accordance with the process of this invention will depend upon the chemical nature of the polymeric film being treated and the use to which the treated film is to be put. Generally, temperatures above 100° C. are sufficient; however, a temperature above 100° C. and below the crystalline melting temperature range (crystalline melting temperature range denotes a range starting with the temperature at which the crystalline structure begins to disappear at an appreciable rate and extending to an upper temperature at which crystallites are no longer evident by X-ray examination) is preferred to heat-treat polymeric films that are within the scope of the present invention. For polyethylene terephthalate film, a temperature range of 170 to 250° C. is preferred.

An important aspect of the invention lies in the step of applying a positive stretching action to the film in the transverse direction while it is at the heat-treating temperature. The extent to which the film is stretched during the heat-treating step helps to overcome the thermal relaxation of the amorphous structure during heat-treating but is not sufficiently great to cause a discernable distortion in the desired relationship between the normal variation of longitudinal direction and transverse direction physical properties. The force applied to the film in a direction perpendicular to the direction of extrusion during the heat-treating step must be sufficient to cause the film to stretch between 2 to 20 percent. Preferably, the film will be stretched to a total of 3 to 10 percent in the transverse direction during heat-treating.

The improvement observed in gauge is believed to be due to orientation differences after normal film stretching, and to the different rates of heat transfer between the heated air in the heat-set zone and thick and thin sections of the film sheet. It is known that the rate of crystallization is dependent on the degree of orientation imparted during stretching, and that the thinner sections of the stretched film sheet are in general more highly oriented than thicker sections. The sheet on entering the heat-set zone has a tendency to change dimension due to thermal expansion followed by contraction due to the density increase and corresponding volume decrease during crystallization, and more importantly due to the thermal relaxation of the orientation of the amorphous structure. If, however, the sheet is slightly stretched while it is being heat-treated, some of the relaxation losses are overcome, the thin sections more highly oriented, crystallize more rapidly than the thick sections and therefore provide points of reinforcement. As a result, the thicker sections are not as crystalline and are the portions of the sheet that can stretch most easily. The thicker sections therefore become thinner relative to the original thin sections. In this way gauge is improved.

Generally, a noticeable improvement in both the longitudinal direction and transverse direction physical properties results. This is also due to the prevention of thermal relaxation of the amorphous structure of the film during heat-treating by the process of the present invention.

The invention will now be more fully described by the following examples.

The advantages of the invention will be apparent from the examples. The primary advantage lies in the aforementioned improvement in transverse direction gauge uniformity. Gauge patterns will be expressed in the examples as either "percent gauge variation" or "gauge magnification."

Percent gauge variation (V) is obtained by measuring the thickness of a sheet of film across its width and substituting the values in the following equation:

$$V = t_2 - t_1/t_0 \times 100$$

wherein $t_2$ is the thickness of the thickest section, $t_1$ is the thickness of the thinnest section, and $t_0$ is the average thickness of the film.

Values of gauge variation greater than 10% are undesirable at commercial practice. Gauge magnification (M) is defined as:

$$V_s/V_1$$

wherein $V_s$ is the percent gauge variation of the final heat-treated film, and
$V_1$ is the percent variation in the film (control) with which the final heat-treated film is being compared, e.g., the control film may be one which (1) has been extruded in a substantially amorphous state and subjected to no further treatment (as cast) or (2) which has been oriented in one or both directions but not heat-treated.

Values of gauge magnification should approach unity, indicating little effect of stretching on gauge variation. Values less than 1 indicate that stretching has actually improved the gauge uniformity.

EXAMPLES 1–5

Samples of substantially amorphous polyethylene terephthalate film (6 mils in thickness) such as that formed by the process disclosed in U.S. Patent 2,465,319 were extruded at a temperature of about 280° C. onto a quench drum where it was chilled to a temperature of about 75° C. and then stretched in the longitudinal direction (LD) over a differential speed roll stretching device to an extent of 3 to 3.5 times its initial dimension at a temperature of 84° C. The film was then stretched between 3 to 3.56 times in the transverse direction (TD) at a temperature of 87° C. in a tenter frame; the extruder, longitudinal direction stretching device and the tenter frame being similar to that described in U.S. Patent 2,823,421. Final thickness of the film was 0.5 mil.

The film then passed into an extension of the tenter frame such as shown in FIGURE 1 where it was heat-treated at a temperature of 200° C. Examples 1 and 3, serving as control examples, were processed in the conventional manner; being restrained from shrinking in the transverse direction by means of tenter clips. In Examples 2, 4 and 5, the rails of the tenter frame in the heat-treating zone were diverged (toed-out) for a distance sufficient to cause the film to be stretched between 3.85 to 6.38 percent in the transverse direction. The extent of stretch of the film in the transverse direction during heat-treating (expressed as percent TD stretch during heat-treatment in the tables to follow) calculated by the formula:

Percent TD stretch during heat-treating $= 100(2X)/(Y)$ where $X$ = the distance the film is extended by stretching beyond the normal transverse stretching operation (measured widthwise along the film surface on both the left and right sides of the film) and
$Y$ = the width of the film after it is stretched in the transverse direction prior to heat-treatment.

This is shown on the attached FIGURE 1. As shown in FIGURE 1, after heat-treating, the film samples were cooled. The film was then wound up in the normal manner. The percent gauge variation was determined for each sample. Table I, below, lists the example number, initial stretch ratios, percent transverse direction stretch during heat-treating, percent gauge variation, and percent improvement of the films prepared in accordance with the process of the present invention compared with the two control examples.

*Table I.—Percent gauge variation of oriented polyethylene terephthalate films stretched slightly in the TD during heat-treatment compared with that for oriented polyethylene terephthalate film heat-treated in the conventional manner*

| Example No. | Initial Stretch Ratio | | Percent TD Stretch During Heat Treating | Percent Gauge Variation | Improvement of TD Stretched Films Over Film Heat-Treated in Conventional Manner, Percent |
|---|---|---|---|---|---|
| | LD | TD | | | |
| 1 | 3.5 | 3.2 | 0 | 19 | 0 |
| 2 | 3.5 | 3.2 | 3.85 | 12 | 37 |
| 3 | 3.65 | 2.9 | 0 | 21 | 0 |
| 4 | 3.65 | 2.9 | 6.38 | 14 | 33 |
| 5 | 3.65 | 3.2 | 5.8 | 13 | 38 |

As can be seen from the above table, the films slightly stretched in the transverse direction during heat-treating exhibit considerable improvement in gauge uniformity over the conventionally treated control films.

EXAMPLES 6–13

These examples illustrate the improvement in physical properties realized by the films prepared by the process of the present invention. Samples of substantially amorphous polyethylene terephthalate film (10 mils thick) prepared as described in Examples 1–5, were stretched in both the longitudinal and transverse directions utilizing the apparatus described in Examples 1–5. Film samples were stretched between 3.0 and 3.5 times their initial length in the longitudinal direction at 82° C. and then stretched between 3.0 and 3.56 times their initial width at 90° C. in the transverse direction. Final thickness of the film was one mil. The film was then passed into an extension of the tenter frame as in Examples 1–5 where it was heat-treated at a temperature of 200° C. Examples 6, 7, 8 and 9 serving as control examples, were processed in the conventional manner, passing through the heat-treating zone of the tenter frame and held under lateral tension by means of tenter clips. In Examples 10–13 (as in Examples 2, 4 and 5) the rails of the tenter frame were diverged for a distance sufficient to cause the film to be stretched between 3.46 and 8.23 percent in the transverse direction. After heat-treating, the film was cooled and wound up.

Physical property data were taken on the films thus prepared and are listed in Table II, below. Included in Table II are the initial stretch ratios employed, percent transverse direction stretch during heat-treating, tensile strength, modulus, $F_5$, and elongation of the films tested.

that this improvement is evident in both the longitudinal and transverse direction physical properties. If the improvement was due to the additional stretch in the transverse direction, one skilled in the art would expect an improvement in the transverse direction only. That this improvement is not due to increased molecular orientation imparted by the slight additional stretch in the transverse direction during heat treating, but rather due to the prevention of thermal orientation relaxation of the amorphous areas, may be better exemplified by the following examples.

EXAMPLES 14–17

Molten polyethylene terephthalate was extruded through a conventional annular die extrusion apparatus such as described in U.S. Patent 2,461,975 to E. D. Fuller, at a temperature of 275° C. The molten polymer was extruded at a rate of 40 lbs./hr. through the .040 inch annular orifice of the die (diameter 2.75 inches). The extruded tubing was withdrawn downwardly in a vertical direction from the die at a rate of 25 feet/minute by a pair of draw rolls positioned 8 inches below the die. Sufficient air (1.7 lbs./sq. inch) necessary to expand the tubing while in a plastic formative state to a diameter 3.75 times that initially extruded was introduced interiorly of the tubing through an air inlet. When the quantity of air had been introduced, the supply was cut off and the air within the tubing comprised an isolated bubble which was sealed in the tubing between the die and the nips of the draw rolls. As soon as the tubing was withdrawn from the die, the pressure began to inflate the tubing.

Simultaneously the film was drawn to an extent of 3 times its original dimension in the longitudinal direction by means of rotating the draw rolls at a speed 3 times in excess of the speed at which the film emerged from the die. Upon being cooled at a temperature where molecular orientation is effected by elongation, the film is elongated to the desired extent in the longitudinal direction. The tubing was drawn through a cooling zone comprising cooling coils positioned in close proximity to the die allowing the air to be impinged on the tubing when the latter was approximately 0.5" from the die. The air served to cool the tubing to a temperature (approximately 90° C.) where molecular orientation is effected by elongation; whereupon the film expanded to its final diameter. After reaching the final diameter, the tubing passed through the draw rolls where it was flattened.

Figure 2:
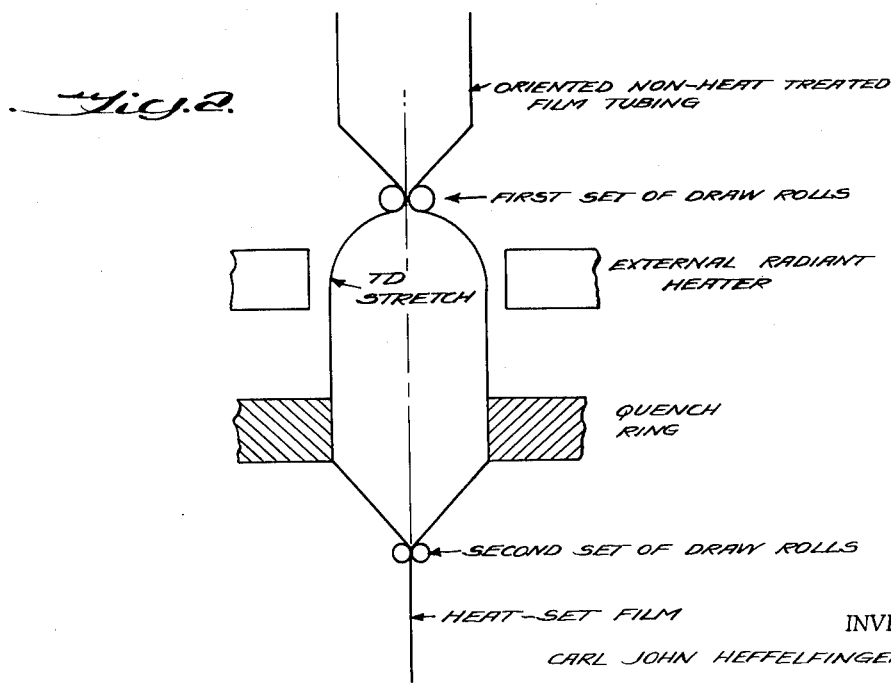
FIGURE 2 illustrates the process of this invention as applied to tubular extrusion.

As illustrated in FIGURE 2, after being flattened in the nips of the draw rolls, the film was reinflated and threaded

*Table II.—Physical property data of oriented polyethylene terephthalate films stretched slightly in the TD during heat treatment compared with that for oriented polyethylene terephthalate films heat treated in the conventional manner*

| Example No. | Initial Stretch Ratios | | Percent TD Stretch During Heat Treating | Tensile Strength (p.s.i.) | | Modulus (p.s.i.) | | $F_5$ (p.s.i.) | | Elongation, Percent | |
|---|---|---|---|---|---|---|---|---|---|---|---|
| | LD | TD | | LD | TD | LD | TD | LD | TD | LD | TD |
| 6 | 3.0 | 3.0 | 0 | 23,450 | 27,180 | 619,000 | 699,000 | 12,817 | 13,400 | 115 | 107 |
| 7 | 3.5 | 3.0 | 0 | 28,750 | 22,700 | 730,000 | 674,000 | 14,733 | 13,883 | 89 | 96 |
| 8 | 3.5 | 3.2 | 0 | 29,350 | 23,700 | 726,000 | 585,000 | 15,650 | 13,944 | 70 | 125 |
| 9 | 3.5 | 3.5 | 0 | 29,717 | 23,920 | 764,000 | 704,000 | 15,017 | 14,583 | 81 | 99 |
| 10 | 3.5 | 3.2 | 3.86 | 32,600 | 34,900 | 713,000 | 794,000 | 21,222 | 20,682 | 83 | 84 |
| 11 | 3.5 | 3.0 | 8.23 | 27,500 | 27,700 | 670,000 | 721,000 | 17,786 | 20,429 | 89 | 84 |
| 12 | 3.5 | 3.5 | 7.03 | 30,700 | 28,000 | 660,000 | 825,000 | 15,797 | 20,685 | 100 | 58 |
| 13 | 3.5 | 3.56 | 3.46 | 31,000 | 34,400 | 691,000 | 783,000 | 18,412 | 20,338 | 84 | 69 |

From Table II it can be seen that a considerable enhancement of physical properties is realized in the films heat-treated by the present process as compared with the control samples. Quite unexpectedly, it will be noted through the nips of a second set of draw rolls. The tubing was inflated by means of air introduced interiorly of the tubing through an air inlet in sufficient quantities to expand the diameter of the tubing between 5 to 6 percent greater than that of its original dimension when heated to 180 to 200° C. Upon being inflated, the tubular film was drawn past radiant heaters located externally of the film bubble. The heaters served to raise the temperature of the film to 180 to 200° C. where the film was simultaneously heat-treated and stretched 5 to 6 percent in the transverse direction. The film was maintained at the heat-treating temperature for a period of two seconds. The film was passed in close proximity to a porous quench ring through which air circulated, thus cooling the heat-treated film. The film then passed through the nips of a second set of draw rolls which are maintained at a speed greater than the first set of draw rolls so as to impart a slight longitudinal direction stretch. Finally the film was slit, and thereafter wound up.

In Examples 15 and 17 the film was also elongated to a slight degree during heat-treating by drawing the film through the nips of a second set of draw rolls at a speed in excess of the first set of draw rolls such that the desired degree of longitudinal direction elongation took place.

As will be seen from the tabulation to follow, the employment of a longitudinal direction stretch alone during the heat-treating step does not provide enhancement of the transverse direction gauge of the film. However, although the impartation of a slight longitudinal direction stretch alone during the heat-treating step does not provide enhancement of the gauge of the film, it is believed that in combination with the necessary slight stretching action in the transverse direction during heat-treating, that a beneficial effect is noticed. This is believed due to an enhancement of the crystallinity of the film. This point can be illustrated by referring to Example 15 listed in Table III, below. In this example the film was stretched 6.7 percent in the longitudinal direction only during heat-treating. As can be seen by the table, no improvement in gauge was noted. Example 14 represents a control film which was initially stretched 3.0 times its length in the longitudinal direction and 3.75 times its width in the transverse direction but not heat-treated. Examples 16 and 17 were molecularly oriented in both directions and heat-treated in accordance with the process of the present invention.

Table III lists the gauge magnification as measured in both the longitudinal and transverse directions, percent longitudinal direction and/or transverse direction stretch imparted during heat-treating, the heat-treating temperature of the film and the dwell time of the film at the heat-treating temperature.

*Table III.—Gauge magnification of oriented tubular polyethylene terephthalate film stretched slightly in the TD during heat treating*

| Example No. | Gauge Magnification | | Percent LD Stretch During H.T. | Percent TD Stretch During H.T. | Heat-Treating Temperature (° C.) | Dwell Time (sec.) |
|---|---|---|---|---|---|---|
| | LD | TD | | | | |
| 14 | 0.98 | 1.05 | 0 | 0 | 200 | 2 |
| 15 | 1.14 | 1.32 | 6.7 | 0 | 200 | 2 |
| 16 | 0.76 | 0.68 | 0 | 5.9 | 200 | 2 |
| 17 | 0.81 | 0.53 | 5.1 | 5.1 | 200 | 2 |

As can be seen from the table, considerable improvement in gauge uniformity in the longitudinal direction as well as the transverse direction is experienced by the film heat treated by the present process.

EXAMPLES 18–19

These examples further illustrate the criticality of imparting a slight stretch in the transverse direction during the heat-treating step. Polyethylene terephthalate films oriented by stretching 3.0 times their initial length in the longitudinal direction and 3.75 times their initial width in the transverse direction as described in Examples 14 to 17, were heat-treated as described in the above examples at a temperature of 160° C. In Example 18, as illustrated by the graph in FIGURE 3, the oriented polyethylene terephthalate film was stretched in the longitudinal direction only during heat-treating; the percent of stretch ranging from −8 (relaxation) to 14. The film was held taut (0% stretch) in the transverse direction. FIGURE 3 shows that as the film is stretched to greater lengths in the longitudinal direction during heat-treating, the transverse direction gauge manification (of the oriented heat-treated film to the oriented non-heat-treated film) decreases slightly from 1.55 at a longitudinal direction ratio of −8 to 1.15 at a longitudinal direction heat-treating stretch of 10%. This indicates an increase in crystallinity of the film and as a result slight reduction in the tendency of the film to thermally relax during heat-treating. Gauge magnification, however, does not reach unity (1.0).

In Example 19, as illustrated by the graph in FIGURE 4, the oriented polyethylene terephthalate film was stretched in both the transverse direction and longitudinal direction during heat-treating; the longitudinal direction stretch being held constant at 13.2% and the transverse direction stretch ranging from −30 (relaxation) to +6%. FIGURE 4 shows as the film is stretched to greater extents in the transverse direction, the transverse direction gauge magnification drops rapidly until at a 6% positive stretch the gauge magnification is less than 0.85; showing considerable gauge improvement over the oriented non-heat-treated film. The graph indicates that a positive transverse direction stretch during heat-treating of at least 2% is necessary to reduce the transverse direction gauge magnification below unity.

EXAMPLES 20 AND 21

A polyvinyl chloride formulation consisting of 93.5% polyvinyl chloride ("Dow" 111–4, Dow Chemical Co.), 3.5% dibutyl tin thioester ("Thermolite" 31, Metal Thermite Co.), and 3% "Lubricin" V–3 (modified castor oil consisting principally of glyceryl triricinoleate, W. B. Baker Castor Oil Co.) was extruded at a temperature of 190° C. through a one inch extruder (National Rubber Machinery Co.) having a barrel length to diameter ratio (L/D) of 18, and equipped with a Robbins two inch die; said die being maintained at a temperature of 200° C. In a manner described in Examples 14 to 17 the extruded polyvinyl chloride film was elongated in both the longitudinal and transverse directions to an extent of 3 times the original dimensions of the film. The film was then passed through the heat-treating apparatus described in Examples 14 to 17 and heat-treated for two seconds at 180° C. The film was elongated during heat-treating in both the longitudinal direction and transverse direction to an extent of 5.9 percent. In Table IV, shown below, the gauge magnification of this film is compared with that of an oriented non-heat-treated (control) film. Again, a considerable improvement in both longitudinal direction and transverse direction gauge is noted.

*TABLE IV.—Gauge variation of oriented polyvinyl chloride films slightly stretched during heat treating compared with that of oriented non-heat treated film*

| Example No. | Percent LD Stretch During Heat-Treating | Percent TD Stretch During Heat-Treating | Heat Treating Film Temp., °C. | Dwell time (sec.) | Gauge Magnification | |
|---|---|---|---|---|---|---|
| | | | | | LD | TD |
| 20 | 0 | 0 | 0 | 0 | 1.0 | 1.0 |
| 21 | 5.9 | 5.9 | 180 | 2 | 0.61 | 0.56 |

EXAMPLES 22-24

A polypropylene resin having a melt index at 190° C. of 0.25, an inherent viscosity of 1.59 and a density of 0.9012 was extruded through a flat die at 255° C. to 260° C. into an 18-mil thick film at a rate of 10 feet/minute. The extruded film was rapidly quenched by drawing it through an ice water bath held at a temperature between 0° C. and 5° C. The quenched film was then heated in an oven to a temperature of 138 to 140° C. and was stretched at this temperature in both the longitudinal and transverse directions in a laboratory bi-directional stretching device to an extent of 5 times (×) its original dimensions. Samples of the 0.6 mil thick film were heat-treated in the laboratory bi-directional stretching device at a temperature of 120° C. while being stretched to a slight extent at slow rates of elongation (approximately 10% per minute) in the transverse direction. The films after stretching and heat-treating were cooled under tension.

Table V, shown below, lists the example number, percent gauge variation before heat-treating, percent transverse direction stretch during heat-treating, heat-treating film temperature, dwell time, percent gauge variation after heat-treating, and the gauge magnification ratio.

The data in Table V indicate that considerable decrease in percent gauge variation is obtained by stretching the oriented polypropylene films to slight extents during heat treating in accordance with the process of the present invention.

Additionally, films treated in accordance with the dictates of the present invention, when subsequently coated with a heat-sealable polymeric coating and converted to packages or bags for commercial use, tend to exhibit a reduced shrinkage around the area of the applied heat-seal thus materially reducing puckering and rupture of the bag or package along the seals.

*Table V.—Gauge variation of oriented polypropylene films slightly stretched during heat-treating compared with that of oriented non-heat treated films*

| Example No. | Percent Gauge Variation Before Heat-Treating | Percent TD Stretch During Heat-Treating | Heat Treating Film Temp., ° C. | Dwell Time (minutes) | Percent TD Gauge Variation After Heat-Treating | TD Gauge Magnification |
|---|---|---|---|---|---|---|
| 22 | 18.6 | 5 | 120 | 10 | 9.5 | 0.51 |
| 23 | 31.4 | 10 | 120 | 10 | 14.3 | 0.46 |
| 24 | 32.5 | 6 | 120 | 10 | 26.0 | 0.80 |
| Control (non-heat-treated) | | 0 | | | | 1.00 |

As shown in the examples described hereinbefore, the process of the present invention provides a surprising reduction in gauge variation across the width of biaxially stretched oriented thermoplastic polymeric films. By practicing the process of the present invention, gauge and gauge related defects which account for substantial losses of film productivity, are substantially eliminated.

Even more surprising and unexpected is the fact that films heat-treated in accordance with the described process exhibit a noticeable increase in physical property level.

What is claimed is:

1. A process for heat treating organic, thermoplastic, crystallizable polymeric film wherein the film has been previously molecularly oriented in both the longitudinal direction and transverse direction to an extent of at least 2.5 times its initial dimensions, which comprises, heating the oriented film to a temperature sufficient to heat-set said film while exerting on the film a positive stretching action in the transverse direction, the total extent of stretch being within the range of 2 to 10 percent.

2. A process for heat treating organic, thermoplastic, crystallizable polymeric film wherein the film has been previously molecularly oriented by stretching in both the longitudinal direction and transverse direction to an extent of from 2.5 to 5 times its initial dimensions, which comprises, heating the oriented film to a temperature within the range of 100 to 250° C. while exerting on the film a positive stretching action in the transverse direction, the total extent of stretch being within the range of 2 to 10 percent.

3. The process of claim 2 wherein the organic, thermoplastic, crystallizable polymeric film is polyvinyl chloride.

4. The process of claim 2 wherein the organic, thermoplastic, crystallizable polymeric film is polyethylene terephthalate.

5. The process of claim 2 wherein the organic, thermoplastic, crystallizable polymeric film is polyethylene.

6. The process of claim 2 wherein the organic, thermoplastic, crystallizable polymeric film is polypropylene.

7. A process for heat treating polyethylene terephthalate film wherein the film has been previously molecularly oriented by stretching in both the longitudinal direction and transverse direction to an extent of at least 2.5 times its initial dimensions, which comprises, heating the oriented film to a temperature within the range of 170 to 250° C. while exerting on the film a positive stretching action in the transverse direction, the total extent of stretch being within the range of 2 to 10 percent.

8. The process of claim 7 wherein the film is heated to a temperature within the range of 190 to 220° C. and the total extent of stretch is within the range of 3 to 10 percent.

9. The process of claim 7 wherein the film is prevented from relaxing in the longitudinal direction while being heat treated.

References Cited by the Examiner

UNITED STATES PATENTS 2,688,773  9/1954  McIntire _____ 264—95
2,916,764  12/1959  Gerber _____ 264—95

FOREIGN PATENTS 219,896  2/1959  Australia.
781,879  8/1957  Great Britain.
851,875  10/1960  Great Britain.

ALEXANDER H. BRODMERKEL, *Primary Examiner.*

MAURICE V. BRINDISI, *Examiner.*

A. LEAVITT, *Assistant Examiner.*